(12) United States Patent
Zatloukal

(10) Patent No.: US 12,328,532 B2
(45) Date of Patent: *Jun. 10, 2025

(54) VARYING AUDIO VISUAL COMPRESSION BASED ON AI DETECTION OR CLASSIFICATION RESULTS

(71) Applicant: Apple Inc., Cupertino, CA (US)

(72) Inventor: Peter Zatloukal, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,929

(22) Filed: May 17, 2022

(65) Prior Publication Data

US 2022/0353458 A1 Nov. 3, 2022

Related U.S. Application Data

(63) Continuation of application No. 16/672,357, filed on Nov. 1, 2019, now Pat. No. 11,343,465.

(51) Int. Cl.
*H04N 7/18* (2006.01)
*G06F 18/2431* (2023.01)
*G06V 20/40* (2022.01)
*G06V 20/52* (2022.01)
*H04N 5/917* (2006.01)
*H04N 7/01* (2006.01)

(52) U.S. Cl.
CPC ......... *H04N 7/181* (2013.01); *G06F 18/2431* (2023.01); *G06V 20/41* (2022.01); *G06V 20/46* (2022.01); *G06V 20/49* (2022.01); *G06V 20/52* (2022.01); *H04N 5/917* (2013.01); *H04N 7/0117* (2013.01); *H04N 7/183* (2013.01)

(58) Field of Classification Search
CPC .... G06F 18/2431; G06V 20/41; G06V 20/46; G06V 20/49; G06V 20/52
See application file for complete search history.

(56) References Cited

U.S. PATENT DOCUMENTS

| | | | |
|---|---|---|---|
| 2006/0209960 A1* | 9/2006 | Katayama | H04N 19/426 375/E7.095 |
| 2015/0088646 A1 | 3/2015 | Mody | |
| 2015/0347861 A1 | 12/2015 | Doepke | |

(Continued)

FOREIGN PATENT DOCUMENTS

CN 109740589 A 5/2019

OTHER PUBLICATIONS

Chinese Office Action from Chinese Patent Application No. 202011183711.9, dated Feb. 1, 2024, 14 pages including machine-generated English language translation.

*Primary Examiner* — Md N Haque
(74) *Attorney, Agent, or Firm* — BAKERHOSTETLER

(57) ABSTRACT

In one embodiment, a computing device receives, from one or more cameras, a video stream comprising multiple frames, where the video stream is received at a first quality. The computing device analyzes, using a machine-learning model, images in the frames, where the machine-learning model has been trained to detect one or more objects-of-interest in the images. The computing device identifies a sequence-of-interest including consecutive frames of the video stream, where at least one object-of-interest was detected in at least one of the consecutive frames. The computing device generates a video package including the sequence-of-interest.

20 Claims, 7 Drawing Sheets

(56) References Cited

U.S. PATENT DOCUMENTS

| | | | |
|---|---|---|---|
| 2016/0044332 A1* | 2/2016 | Maaninen | H04N 19/105 |
| | | | 375/240.16 |
| 2018/0121762 A1 | 5/2018 | Han et al. | |
| 2018/0136332 A1 | 5/2018 | Barfield, Jr. | |
| 2019/0258885 A1 | 8/2019 | Piette | |
| 2020/0273176 A1* | 8/2020 | Takeda | G06T 7/194 |

* cited by examiner

VARYING AUDIO VISUAL COMPRESSION BASED ON AI DETECTION OR CLASSIFICATION RESULTS

TECHNICAL FIELD

This disclosure generally relates to machine-learning tasks, and more particularly to indications of activity performed by machine-learning tasks.

BACKGROUND

Machine learning techniques, including neural networks, may be applied to problems in computer vision, audio processing, and other areas. Neural networks may be used to perform tasks such as image classification, object detection, image segmentation, and speech recognition. Neural networks have been trained to classify images using large datasets that include millions of images with ground truth labels, for example. Machine-learning techniques may be performed on input received from sensors such as cameras, microphones, and the like. The sensors may be attached to a user's computing device, such as a laptop or mobile phone. For example, a web cam may capture video of the user, and a microphone may capture the user's speech.

SUMMARY OF PARTICULAR EMBODIMENTS

In particular embodiments, computing devices comprising cameras may be utilized in a network environment to monitor a scene. Cameras may be used to capture details of the activity within the scene. Generally, cameras may be used as a security measure to provide material in the instance a user needs to review footage captured by the cameras. However, oftentimes the footage may not be the best quality. This may be the result of needing to conserve storage space for all of the material gathered throughout the day, week, etc. Cameras used today may be able to produce quality videos, but for many scenarios it may not make sense to maintain that quality for storage purposes. The reason behind that is there may not be the storage space available to store high-quality videos of a 24-hour video for 7 days a week. Additionally, multiple cameras may be contributing their individual video streams so there may be a large storage space requirement should each individual video stream need to be stored. There may be a large cost associated with the large storage space requirement. To combat this issue of lack of sufficient storage and reduce the cost associated with the video stream storage, usually the entire video stream may be compressed to reduce the size of the video to a size that can be stored in a longer-term storage. However, the reduction in resolution may make it harder to view the video stream and determine important details from the video stream. To address this issue of reduction in quality while still taking into account of storage capacity restrictions, a computing device may identify a sequence-of-interest in order to maintain the video quality for important scenarios where fidelity is important.

In particular embodiments, to identify a sequence-of-interest, a computing device may use a machine-learning model to detect one or more objects-of-interest in images in frames associated with a video stream. In particular embodiments, the computing device may classify various detected objects within an image frame of a video stream. The classification of objects may help identify a sequence-of-interest and whether to preserve the video quality of the video stream. In particular embodiments, the computing device may vary the audio or video compression based on the classification. By selectively compressing portions of the video stream, the computing device may preserve the video quality of sequences-of-interest without significantly increasing the cost of storage of the video stream. This may help improve the ability for a user to review a video stream by improving the quality of the video for the sequences-of-interest.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
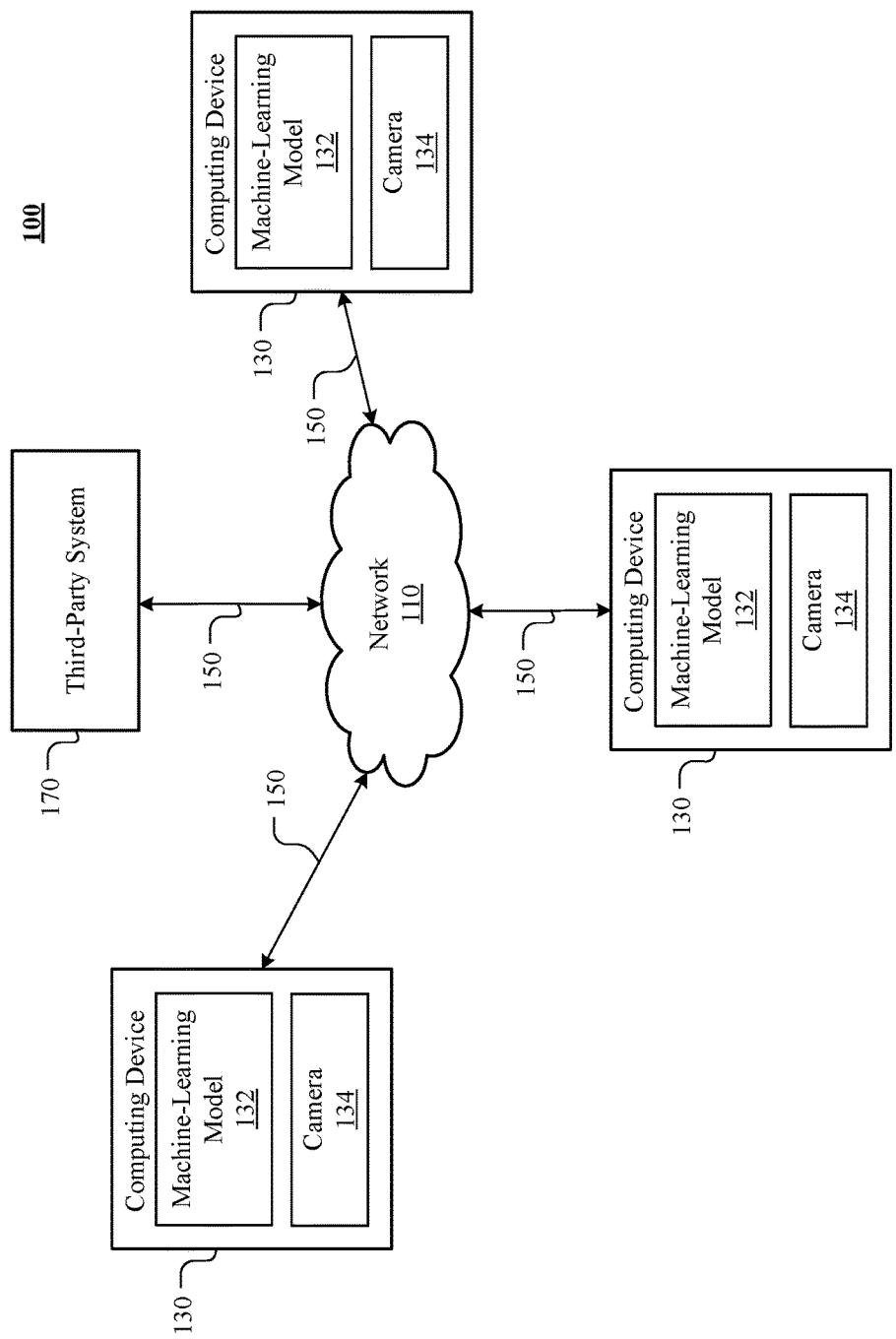
FIG. 1 illustrates an example network environment associated with multiple camera devices.

In particular embodiments, computing devices comprising cameras may be utilized in a network environment to monitor a scene. As an example and not by way of limitation, cameras may be placed to monitor the interior of a bank. Cameras may be used to capture details of the activity within a scene. Generally, cameras may be used as a security measure to provide material in the instance a user needs to review footage captured by the cameras. As an example and not by way of limitation, a user may need to review the footage in the instance there was robbery that took place in the bank. However, oftentimes the footage may not be the best quality. This may be the result of needing to conserve storage space for all of the material gathered throughout the day. Cameras used today may be able to produce quality videos, but for many scenarios it may not make sense to maintain that quality for storage purposes. The reason behind that is there may not be the storage space available to store high-quality videos of a 24-hour video for 7 days a week. Additionally, multiple cameras may be contributing their individual video streams so there may be a large storage space requirement should each individual video stream need to be stored. There may be a large cost associated with the large storage space requirement. To combat this issue of lack of sufficient storage and reduce the cost associated with the video stream storage, usually the entire video stream may be compressed to reduce the size of the video to a size that can be stored in a longer-term storage. As an example and not by way of limitation, if a video is recorded with a 1080 p resolution, the video stream resolution may be reduced to 240 p to be able to store a longer length video stream. However, the reduction in resolution may make it harder to view the video stream and determine important details from the video stream. To address this issue, a computing device may identify a sequence-of-interest in order to maintain the video quality for important frame sequences where fidelity is important. As an example and not by way of limitation, a sequence-of-interest may be where a camera observes an intruder breaking into a user's home. Preservation of high video quality for that frame sequence may aid in identifying a suspect in the future.

In particular embodiments, to identify a sequence-of-interest, a computing device may use a machine-learning model to detect one or more objects-of-interest in images in frames associated with a video stream. As an example and not by way of limitation, an object-of-interest may be a weapon identified in an image frame of a video stream. In particular embodiments, the computing device may classify various detected objects within an image frame of a video stream. The classification of objects may help identify a sequence-of-interest and whether to preserve the video quality of the video stream. As an example and not by way of limitation, an identification of an object classified as a weapon within an image frame may be an initial frame of a sequence-of-interest. In particular embodiments, the computing device may vary the audio or video compression based on the classification. As an example and not by way of limitation, if the computing device detects an object that is classified as miscellaneous, then the computing device may compress the frames of the video stream that have the object to a reduced resolution but better than a frame with no detected objects. Whereas, a frame with a detected object that is classified as a weapon may not have the resolution altered. In particular embodiments, frames of a sequence-of-interest may be compressed using a lossless algorithm, whereas other frames of the video stream may be compressed using a lossy algorithm that results in more compact data. By selectively compressing portions of the video stream, the computing device may preserve the video quality of sequences-of-interest without significantly increasing the cost of storage of the video stream. This may help improve the ability for a user to review a video stream by improving the quality of the video for the sequences-of-interest.

FIG. 1 illustrates an example network environment 100 associated with one or more camera systems. In particular embodiments, the network environment 100 may include multiple computing devices 130 and a third-party system 170 connected to each other by a network 110 through links 150. Although, three computing devices 130 are shown, there may be any number of computing devices 130 within the network environment 100. In particular embodiments, the computing devices 130 may include a machine-learning model 132 that may be trained to detect objects-of-interest within images captured by the cameras 134. In particular embodiments, the computing devices 130 may be embodied as any suitable computing device, such as, for example, a laptop computer, a cellular telephone, a smartphone, a tablet computer, a camera device, or a video camera device. In particular embodiments, the computing device 130 may be a device specifically for recording a video stream, which may be a plurality of frames containing images.

In particular embodiments, the machine-learning model 132 may be trained through analyzing a plurality of images to identify objects-of-interest. In particular embodiments, the machine-learning model 132 may be trained in any suitable way. In particular embodiments, the machine-learning model 132 may be updated with any training data from other machine-learning models 132. In particular embodiments, the computing devices 130 may be set to compress a video stream received from cameras 134 to a lower quality by default. This default setting may help to ensure the storage of the video streams do not exceed a storage capacity. In particular embodiments, each computing device 130 with a camera 134 may have its own camera view, which may be a view of a scene. The camera views of the computing devices 130 may overlap, be separate, or any combination thereof. In particular embodiments, the computing devices 130 may receive a video stream comprising a plurality of frames from their respective cameras 134. The video stream may initially be received at the highest resolution capable by the cameras 134. In particular embodiments, the computing device 130 may reduce the resolution of the video stream and compress the video stream to be stored. In particular embodiments, the computing device 130 may initially analyze the images of the video stream by using the machine-learning model 132. The computing device 130 may use the machine-learning model 132 to detect objects-of-interest in the images of the received video stream. Once no objects-of-interest are detected, the computing device 130 may compress the video stream to a reduced resolution. In particular embodiments, the computing device 130 may generate a video package comprising the compressed video stream. The computing device 130 may generate a video package comprising compressed video stream of any size or length for storage purposes.

In particular embodiments, the third-party system 170 may be a server where the video streams are uploaded from the computing devices 130 to be stored to be accessed at a future time. In particular embodiments, the storage may erase old video streams should a storage capacity be reached. In particular embodiments, the third-party system 170 may prioritize uncompressed video streams and delete compressed video streams initially. In particular embodiments, the third-party system 170 may determine whether or not the compressed video stream is associated with a time period that exceeds a threshold time period. As an example and not by way of limitation, the third-party system 170 may want to keep and store video streams (compressed and uncompressed) that are less than a week old. However, if the stored video stream is older than a week, then the third-party system 170 may delete older stored video streams and prioritize deleting compressed video streams first should a storage capacity be reached.

In particular embodiments, the network environment 100 may be used to monitor a scene. As an example and not by way of limitation, the computing devices 130 may be set up to monitor an interior of a bank. In particular embodiments, if one computing device 130 detected an object-of-interest, other computing devices 130 of the network environment 100 may be triggered to maintain the quality (e.g., resolution) of the video stream for their respective video streams despite not detecting an object-of-interest. By triggering surrounding computing devices 130 to maintain the quality of their video streams, the quality may be maintained with respect to the object-of-interest should the object-of-interest transition from one camera view to another camera view. In particular embodiments, the number of computing devices 130 may affect the compression of the video stream received from the cameras 134. As an example and not by way of limitation, in order to conserve storage capacity, if an object-of-interest was detected in one camera view of one computing device 130, then instead of receiving the video streams at the highest resolution, other computing devices 130 may reduce the resolution slightly (but not to the default setting where no objects-of-interest are detected). In particular embodiments, the computing device 130 may track the object-of-interest within a camera view and trigger other computing devices 130 to stop compressing their respective video streams when the computing device 130 determines the object-of-interest will enter another camera view. As an example and not by way of limitation, the surrounding computing devices 130 may record and store or upload video streams at the highest resolution if one computing device 130 determines the object-of-interest is approaching the camera view of other computing devices 130. As another example and not by way of limitation, if the computing devices 130 are numbered in order, the computing device 130 that currently detects an object-of-interest may notify the computing device 130 that is next in the order to store or upload their respective video stream at the highest resolution. In particular embodiments, the computing device 130 may continue to store or upload an uncompressed video stream (e.g., video stream of the highest resolution) for a threshold time period after an object-of-interest has not been detected within any images corresponding to the video stream.

In particular embodiments, when a computing device 130 detects an object-of-interest within an image in a frame of a video stream, the computing device 130 may identify a sequence-of-interest. The initial frame that an object-of-interest is detected in may be the first frame of the sequence-of-interest. In particular embodiments, the sequence-of-interest may be a plurality of consecutive frames of a video stream that contain the object-of-interest at least in one of the frames. In particular embodiments, the computing device 130 may store the frames of a video stream in a buffer as the computing device 130 is preparing to store the video stream or upload the video stream. In particular embodiments, the initiation of storing frames in a buffer may be in response to detecting an object-of-interest in the images of the video stream. The conclusion of the storing frames in the buffer may be in response to determining that an object-of-interest is not detected in a minimum number of images in frames of the video stream. As an example and not by way of limitation, the computing device 130 may initiate storing frames in a buffer corresponding to the sequence-of-interest and conclude the storage of frames when a minimum number of images (e.g., 100 frames) do not have an object-of-interest following the sequence-of-interest. In particular embodiments, the last frame of the sequence-of-interest may correspond to the last frame that comprises an image with an object-of-interest. In particular embodiments, the sequence-of-interest may comprise several images in frames that do not have an object-of-interest. As an example and not by way of limitation, if an object-of-interest is moving in and out of a camera view of a computing device 130, the computing device 130 may continually add frames to the sequence-of-interest. In particular embodiments, the computing device 130 may generate a video package comprising the sequence-of-interest. In particular embodiments, the computing device 130 may generate the video package in response to the conclusion of the storage of frames in the buffer. In particular embodiments, the computing device 130 may generate a video package when the buffer has dropped below a minimum threshold of available capacity. In particular embodiments, the computing device 130 may transmit and/or store the video package to the third-party system 170 or to another computing device 130 in response to determining that an object-of-interest has not been detected in a minimum number of images in frames following the sequence-of-interest. As an example and not by way of limitation, the computing device 130 may determine that there have been 200 frames where an object-of-interest has not been detected and generate a video package comprising the sequence-of-interest and transmit that to the third-party system 170. In particular embodiments, the computing device 130 may store the frames of the video stream in a buffer for a predetermined number of frames (e.g., 5000 frames). The computing device 130 may compress the frames in the buffer if no object-of-interest has been detected in a threshold number of frames (e.g. 2000 frames). In particular embodiments, if the computing device 130 identifies a sequence-of-interest while there are frames in the buffer that do not have an object-of-interest, then the computing device may add those frames to the sequence-of-interest. This may be beneficial in the instance a user wants to review the video stream prior to when the sequence-of-interest occurs. In particular embodiments, the computing device 130 may determine that none of the objects-of-interest were detected in images of a continuous video frame sequence that are received prior to or after the sequence-of-interest. The computing device 130 may compress the continuous video frame sequence, which may reduce the resolution of the images. The computing device may generate a separate video package comprising the compressed sequence. In particular embodiments, the computing device 130 may combine the separate video package with the any other video package generated to transmit or store. In particular embodiments, the computing device 130 may transmit or store any video packages as they are generated.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect computing devices 130 and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
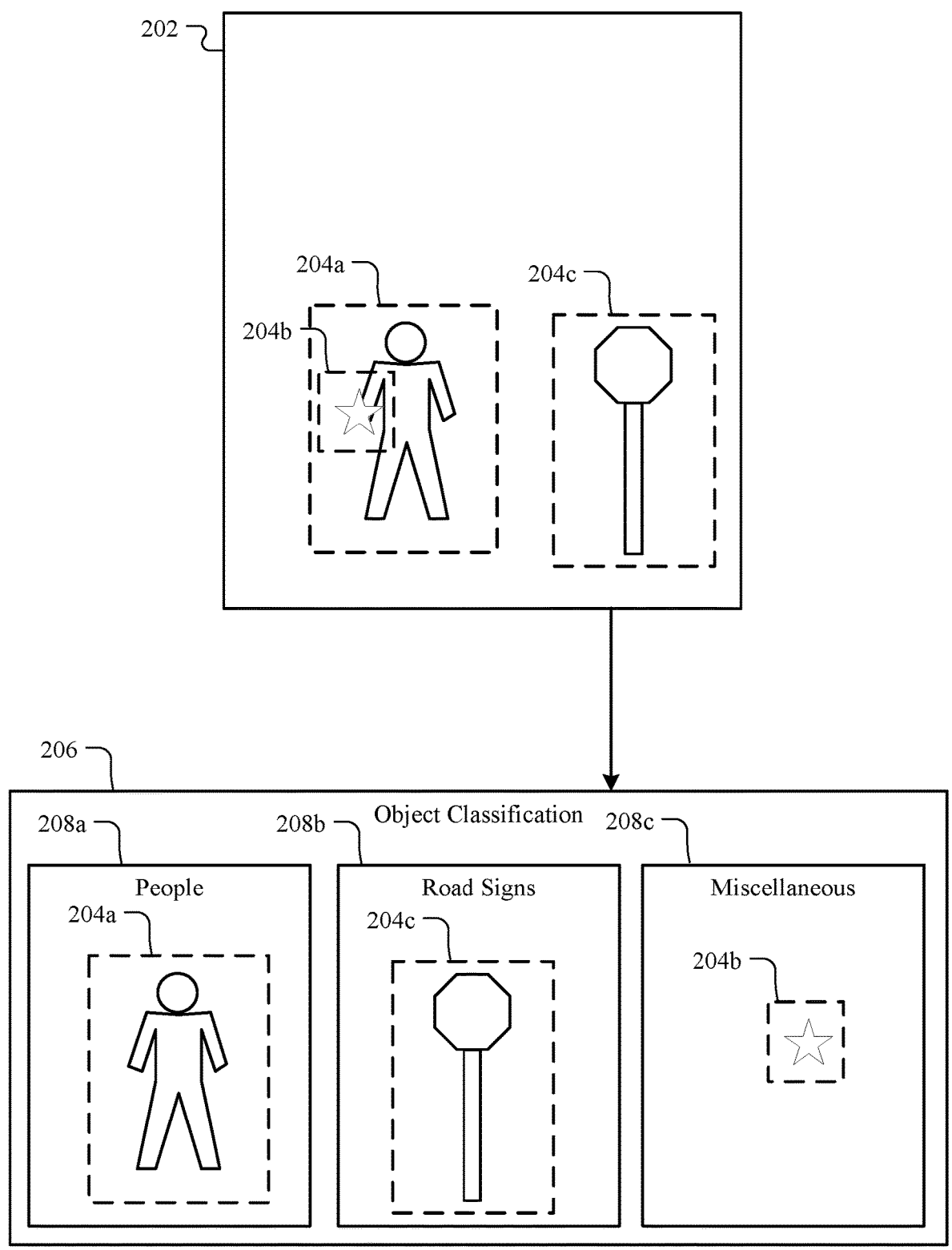
FIG. 2 illustrates an example process of performing object classification with an image.

FIG. 2 illustrates an example process 200 of performing object classification with an image. In particular embodiments, the computing device 130 may receive an image 202 from a camera 134. In particular embodiments, the image 202 may comprise a plurality of different objects 204a-204c. In particular embodiments, the computing device 130 may use a machine-learning model 132 to classify detected objects 204 and identify one or more objects-of-interest from the detected objects 204. As an example and not by way of limitation, the computing device 130 may identify a stop sign 204c from the image 202. In particular embodiments, the computing device 130 may use a classification table 206 to classify each identified object 204 in the image 202 and place them in a category 208. In particular embodiments, the machine-learning model 132 may have a set of predetermined categories to use to classify any identified objects in an image. In particular embodiments, the machine-learning model 132 may add categories as necessary when identifying a new object that has not been categorized. In particular embodiments, the computing device 130 may classify the detected objects into one of the plurality of categories. As an example and not by way of limitation, the computing device 130 may identify an object-of-interest 204b as a miscellaneous object. In particular embodiments, the computing device 130 may classify detected objects-of-interest into one of the plurality of categories. The computing device 130 may identify a sequence-of-interest based on detecting an object-of-interest of a particular category.

In particular embodiments, the machine-learning model 132 may be trained to be understand the environment the computing device 130 is located. As an example and not by way of limitation, the computing device 130 may be located in a firearms store. The identification of a detected object that is a weapon may be constant given the location and objects (e.g., firearms) in the camera view of the computing device 130. As such, the machine-learning model 132 may be trained to not label a firearm as an object-of-interest. In particular embodiments, the machine-learning model 132 may use the context of the computing device 130 in order to correctly identify objects-of-interest. In particular embodiments, the context may include what objects are generally in the camera view of the computing device 130. In particular embodiments, the computing device may modify a resolution of a video package based on the category of one or more detected objects-of-interest. As an example and not by way of limitation, a detected object-of-interest of a weapon category may result in the computing device 130 to generate a video package of the highest resolution possible. As another example and not by way of limitation, a detected object-of-interest of a miscellaneous category may result in the computing device 130 to generate a video package of a slightly reduced resolution.

In particular embodiments, the machine-learning model 132 may use a plurality of different libraries for different environments. As an example and not by way of limitation, if the computing device 130 is located in a restaurant, the machine-learning model 132 may use a restaurant library to identify common objects to be detected within the restaurant setting. As an example and not by way of limitation, a steak knife would be a common object within a restaurant setting, as such that may not be identified as an object-of-interest should the steak knife appear in an image of a video stream. In particular embodiments, the machine-learning model 132 may determine whether a particular library needs to be updated for a given location. In particular embodiments, the machine-learning model 132 may add or remove objects to be identified as an object-of-interest within a particular environment. As an example and not by way of limitation, the machine-learning model 132 may remove a miscellaneous item to be detected as an object-of-interest if it is commonly detected by the computing device 130. For instance, a puck may originally be detected as an object-of-interest in a restaurant setting, but it may be removed if it appears frequently because the restaurant has a shuffleboard where the pucks are used.

Figure 3:
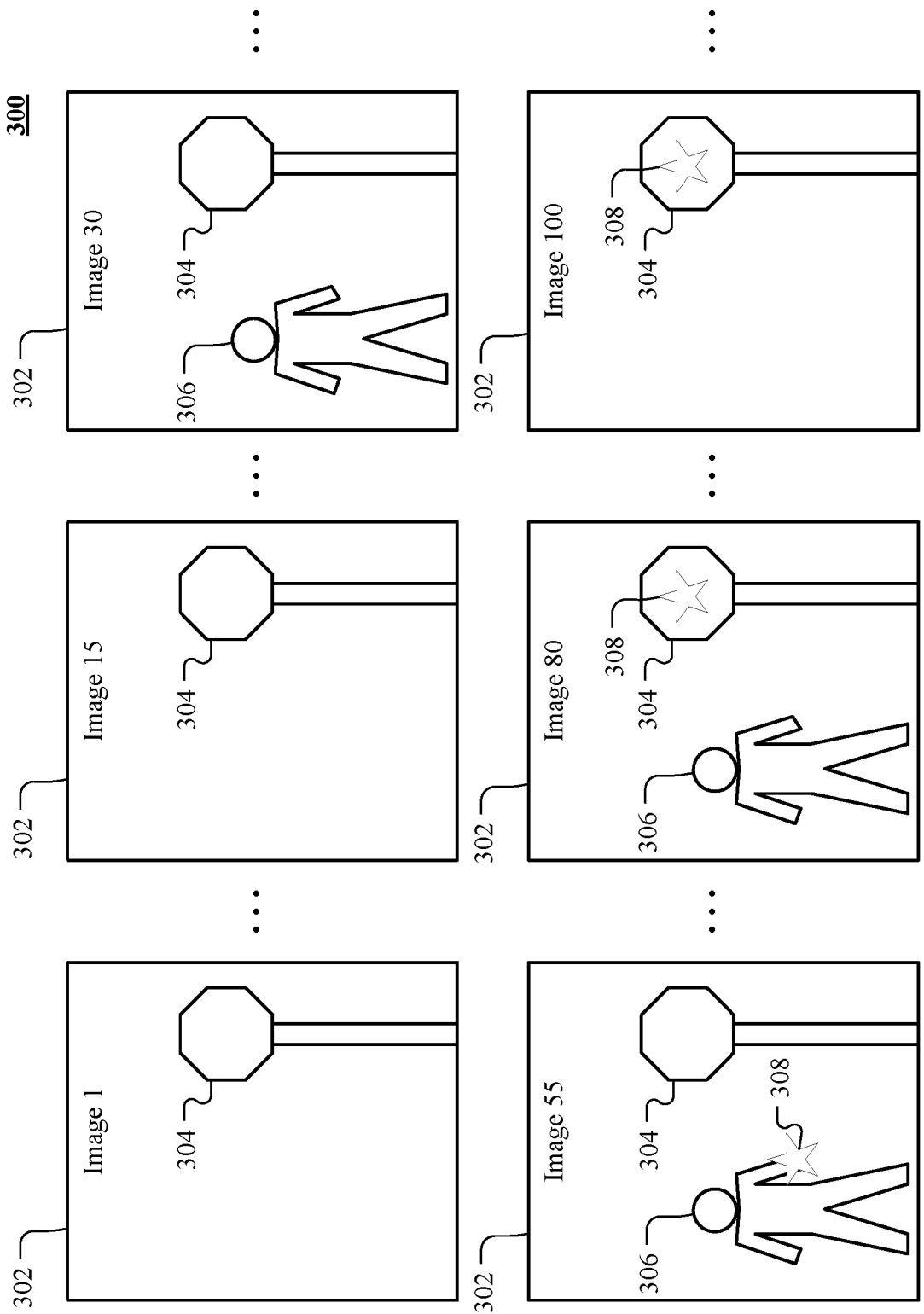
FIG. 3 illustrates an example video stream received from a camera.

FIG. 3 illustrates an example video stream 300 received from a camera. In particular embodiments, the video stream 300 may comprise a plurality of frames 302 containing images. Each of the images within the frames 302 may comprise a plurality of objects 304, 306, 308. In particular embodiments, the computing device 130 may use a machine-learning model 132 to detect objects within an image of a frame 302. From the detected objects, the computing device 130 may classify each detected object in an image into one or more categories of a plurality of categories. In particular embodiments, the computing device 130 may use a machine-learning model 132 to analyze the images to identify one or more objects-of-interest from the detected objects based on the categories and context of the computing device 130. In particular embodiments, the computing device 130 may identify object 308 as an object-of-interest based on the category of the object 308 and the context of the computing device 130. As an example and not by way of limitation, the computing device 130 may identify object 308 as a sticker which is not commonly seen in a street setting and so it may be labelled as an object-of-interest. In particular embodiments, a detected object 308 may originally not identified as an object-of-interest until an action is performed with that object 308. As an example and not by way of limitation, a student walking down the street may have a backpack covered in stickers and this may be a regular occurrence. However, when a sticker is used in a specific manner as in defacing a sign 304, the machine-learning model 132 may identify when the action is performed and detect an object-of-interest. As another example and not by way of limitation, in an office setting papers may be a common detected object and so the machine-learning model 132 may determine papers are not objects-of-interest when people walk through the camera view of the computing device 130 with a folder or box of papers. However, if a person were to walk through the camera view and trip and spill papers across the floor, the machine-learning model 132 may identify papers as an object-of-interest. As another example and not by way of limitation, if a weapon is detected in a firearms store that may not be detected as an object-of-interest, but if a person comes into view brandishing a weapon, the machine-learning model 132 may detect an object-of-interest because of an action that is being performed with the weapon.

Figure 4:
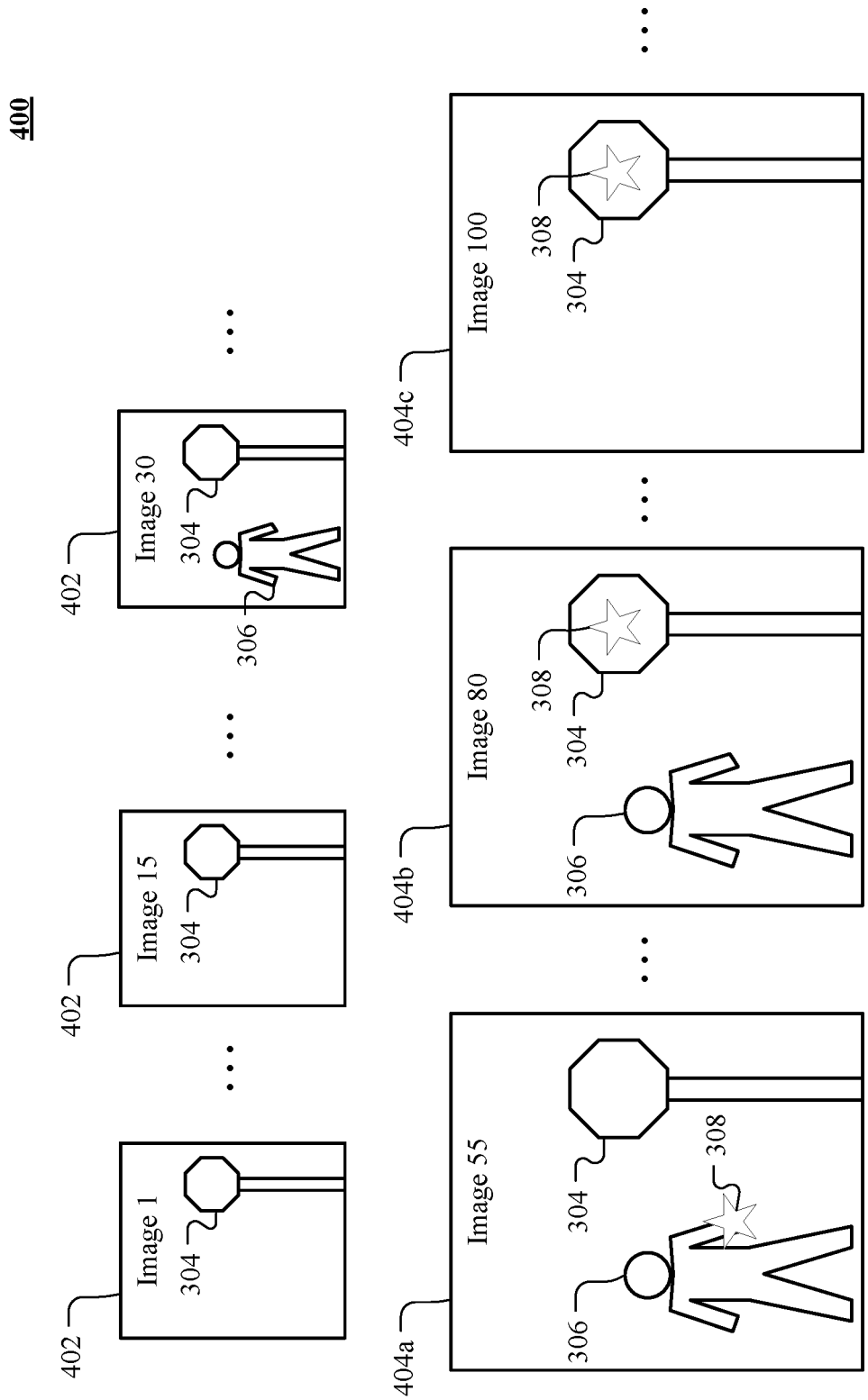
FIG. 4 illustrates an example video package generated by a computing device based on AI detection and classification results.

FIG. 4 illustrates an example video package 400 generated by a computing device 130 based on AI detection and classification results. In particular embodiments, the computing device 130 may identify a sequence-of-interest based on detection of an object-of-interest in an image 302. The computing device 130 may identify object 308 as an object-of-interest and identify image 55 as the initial frame 404a of a sequence-of-interest 404. In particular embodiments, the computing device 130 may generate the video package 400 comprising the frames 402 and sequence-of-interest 404. In particular embodiments, the computing device 130 may leave the sequence-of-interest at the same resolution the images were captured in. The computing device 130 may compress the images of frames 402 where no object-of-interest was detected to reduce the resolution. As a result, the computing device 130 may reduce the storage size of the images of frames 402. As an example and not by way of limitation, since the computing device 130 detected object 308 as an object-of-interest, other images that do not have object 308 may be compressed. As shown, the computing device 130 may compress images 1 to images 30 because the object 308 is not within the images. The computing device 130 may generate the video package 400 comprising the frames 402 and the sequence-of-interest 404. In particular embodiments, the sequence-of-interest 404 may include an initial frame 404a where an object-of-interest is first detected and a conclusion frame 404c where the object-of-interest is last detected. In this case, the computing device 130 may identify a conclusion frame 404c in the case that the image has not changed for a predetermined amount of frames. As an example and not by way of limitation, since object 308 is a sticker defacing a sign 304, nothing will change unless another detected object is identified in a subsequent image and therefore the computing device may conclude the sequence-of-interest 404 after a threshold number of frames have passed with no changes in the image. In particular embodiments, the computing device 130 may analyze the images of the video stream 300 to determine whether there is a threshold amount of change. As an example and not by way of limitation, if a leaf falls into view of the image that may not be a significant change. However, if a person comes into view of the image again, then the computing device 130 may identify another sequence-of-interest. In particular embodiments, the computing device 130 may identify a threshold change by determining how many pixels have changed from a previous image. If a threshold number of pixels change from one image to the next image then the computing device 130 may identify another sequence-of-interest.

In particular embodiments, if the computing device 130 determines the image has not changed for any given number of frames, the computing device 130 may identify one frame of a compressed sequence that is representative of the compressed sequence and replace the compressed sequence with the one frame. Additionally, since the computing device 130 may be replacing the compressed sequence with one frame, then the computing device 130 may restore the resolution of the one frame so the image is at the fullest resolution. In particular embodiments, the computing device 130 may use a buffer to periodically identify any changes in the images received from a video stream. As an example and not by way of limitation, if the camera view of the computing device 130 is directed to a single door, an identified sequence-of-interest may be when the door opens and closes or if there is anything that comes into camera view (e.g., a person to open the door). As such, the computing device 130 may continually use the same image representative of the video stream if there is no change that occurs. The computing device 300 may use a buffer to retroactively add previous frames that have not yet been compressed to a sequence-of-interest if a sequence-of-interest has been identified. As an example and not by way of limitation, if a person is walking up to a cash register at a store, the computing device 130 may determine this is a regular occurrence and not to be identified as a sequence-of-interest. However, if at a later point the person pulls out a weapon, the computing device 130 may identify a sequence-of-interest and retroactively add frames in the buffer that correspond to the first identification of the person within the images of the received video stream.

In particular embodiments, the computing device 130 may continually upload or store frames of a sequence-of-interest 404 as it receives them from a camera 134. That is, the computing device 130 may generate one frame video packages to be upload or store. In particular embodiments, the computing device 130 may determine any number of frames to include in a video package to be uploaded or stored.

Figure 5:
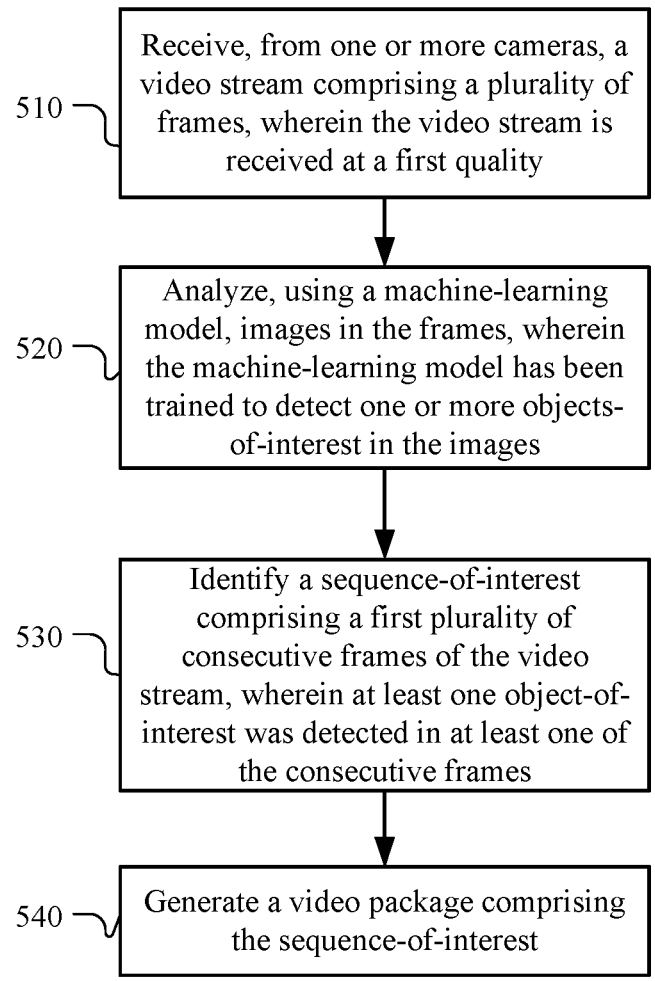
FIG. 5 illustrates an example method for using a machine-learning model to vary audio or video compression based on identification of objects-of-interest.

FIG. 5 illustrates an example method for using a machine-learning model to vary audio or video compression based on identification of objects-of-interest. The method may begin at step 510, where a computing device may receive, from one or more cameras, a video stream comprising a plurality of frames. In particular embodiments, the video stream may be received at a first quality. The first quality may be at the highest resolution capable by the cameras. At step 520, the computing device may analyze, using a machine-learning model, images in the frames. In particular embodiments, the machine-learning model may be trained to detect one or more objects-of-interest in the images. At step 530, the computing device may identify a sequence-of-interest comprising a first plurality of consecutive frames of the video stream. In particular embodiments, at least one object-of-interest may be detected in at least one of the consecutive frames. At step 540, the computing device may generate a video package comprising the sequence-of-interest. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for using a machine-learning model to vary audio or video compression based on identification of objects-of-interest including the particular steps of the method of FIG. 5, this disclosure contemplates any suitable method for using a machine-learning model to vary audio or video compression based on identification of objects-of-interest including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
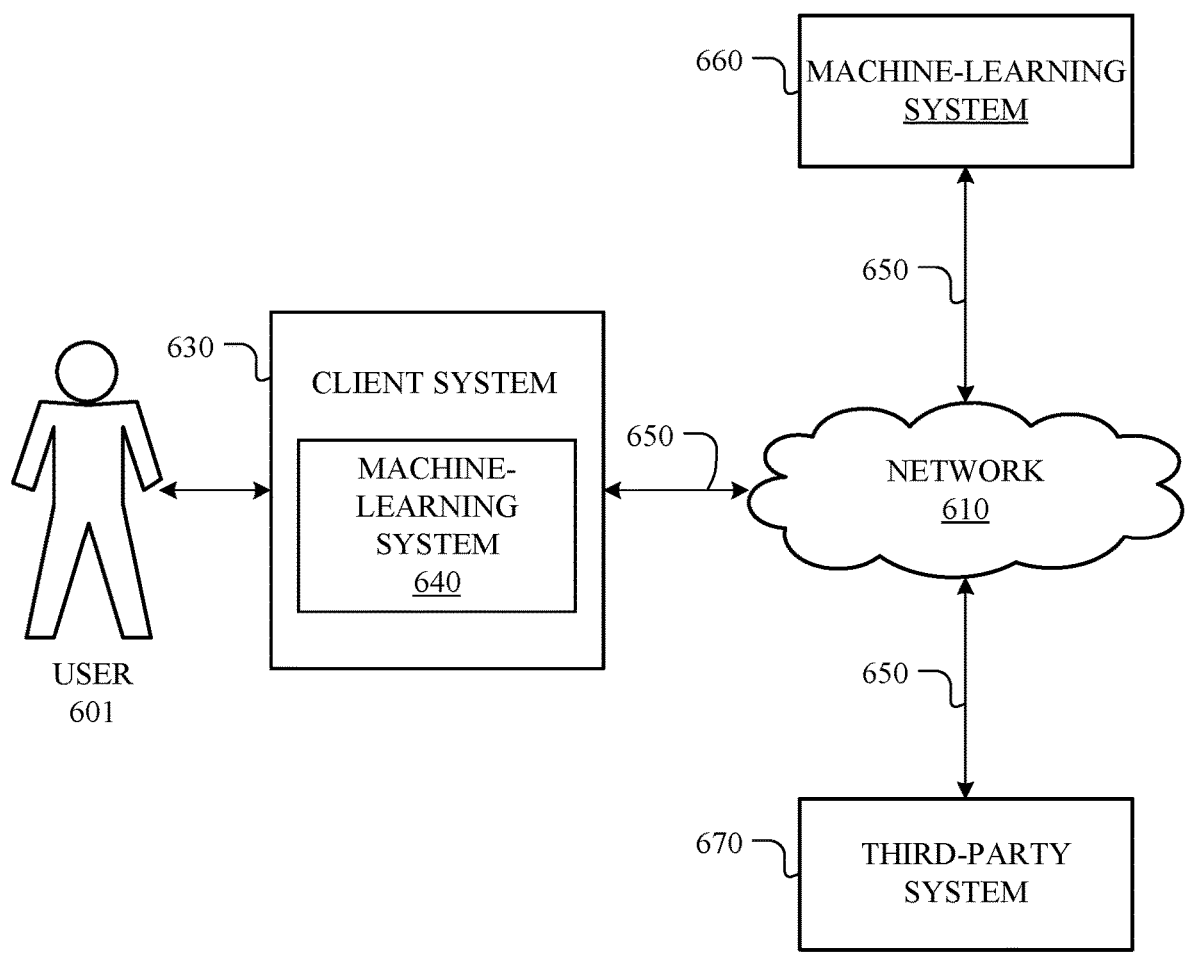
FIG. 6 illustrates an example network environment associated with one or more machine-learning systems.
Figure 7:
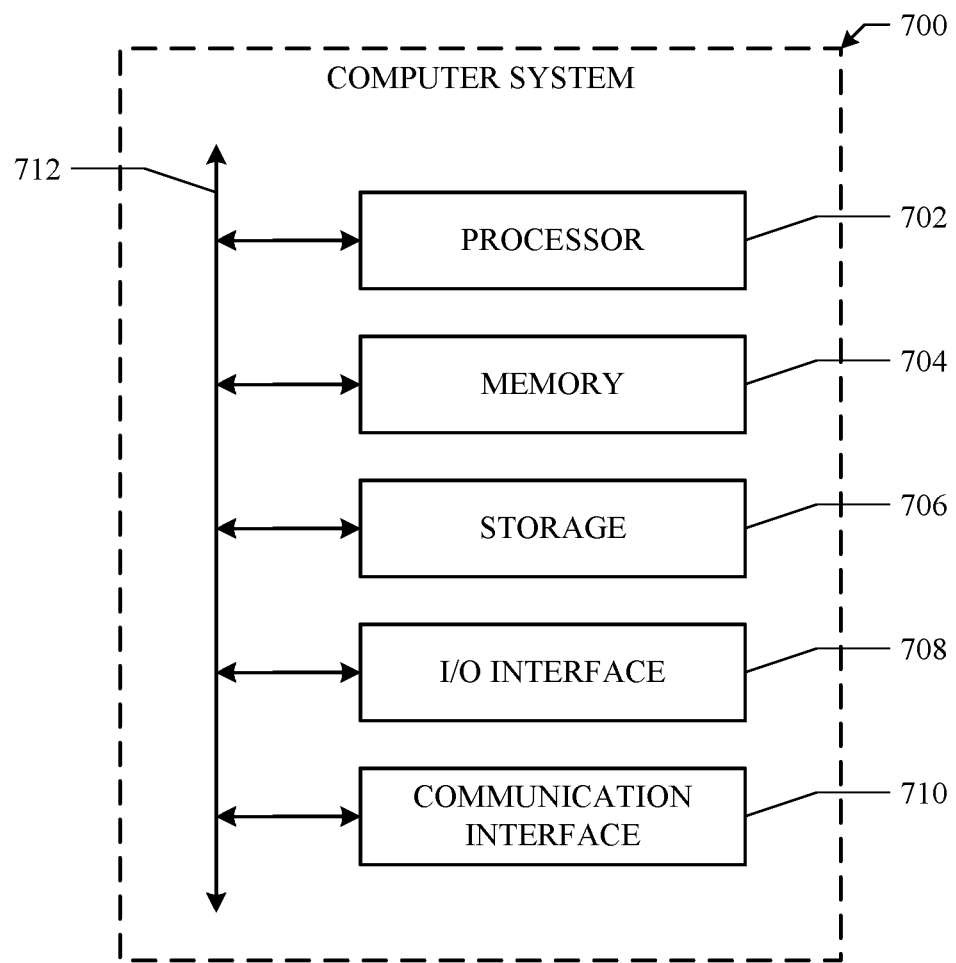
FIG. 7 illustrates an example computer system.

FIG. 6 illustrates an example network environment 600 associated with one or more machine-learning systems. Network environment 600 includes a user 601, a client system 630, a client-hosted machine-learning system 640, a server-hosted machine-learning system 660, and a third-party system 670 connected to each other by a network 610. Although FIG. 6 illustrates a particular arrangement of user 601, client system 630, machine-learning system 660, third-party system 670, and network 610, this disclosure contemplates any suitable arrangement of user 601, client system 630, machine-learning systems 640, 660, third-party system 670, and network 610. As an example and not by way of limitation, two or more of client system 630, server-hosted machine-learning system 660, and third-party system 670 may be connected to each other directly, bypassing network 610. As another example, two or more of client system 630, machine-learning system 660, and third-party system 670 may be physically or logically co-located with each other in whole or in part. A client-hosted machine-learning system 640 may be located on the client system 630. Moreover, although FIG. 6 illustrates a particular number of users 601, client systems 630, machine-learning systems 640, 660, third-party systems 670, and networks 610, this disclosure contemplates any suitable number of users 601, client systems 630, machine-learning systems 640, 660, third-party systems 670, and networks 610. As an example and not by way of limitation, network environment 600 may include multiple users 601, client systems 630, machine-learning systems 640, 660, third-party systems 670, and networks 610.

In particular embodiments, user 601 may be an individual (human user) such as an application/software developer, an entity (e.g., an enterprise, business, or third-party application), or a group (e.g., of individuals or entities) that interacts or communicates with or over one or more of machine-learning systems 640, 660. In particular embodiments, client-hosted machine-learning system 640 may be an inference engine and one or more machine-learning models. In particular embodiments, server-hosted machine-learning system 660 may be a network-addressable computing system for performing tasks using an inference engine 104 and one or more machine-learning models 106. Server-hosted machine-learning system 660 may be accessed by the other components of network environment 600 either directly or via network 610. Third-party system 670 may be accessed by the other components of network environment 600 either directly or via network 610. In particular embodiments, one or more users 601 may use one or more client systems 630 to access, send data to, and receive data from client-hosted machine-learning system 640, server-hosted machine-learning system 660, or third-party system 670. Client system 630 may access server-hosted machine-learning system 660 or third-party system 670 directly, via network 610, or via a third-party system. As an example and not by way of limitation, client system 630 may access third-party system 670 via server-hosted machine-learning system 660. Client system 630 may be any suitable computing device, such as, for example, a personal computer, a laptop computer, a cellular telephone, a smartphone, a tablet computer, or an augmented/virtual reality device.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, server-hosted machine-learning system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving a video stream comprising a plurality of frames;
   identifying a sequence-of-interest comprising a plurality of consecutive frames of the video stream, wherein at least one object-of-interest was detected, using a machine-learning model, in at least one of the plurality of consecutive frames; and
   selectively compressing at least a portion of the video stream to include or exclude the identified sequence-of-interest.

2. The method of claim 1, further comprising:
   transmitting the video stream in response to determining the at least one object-of-interest was not detected in a minimum number of images in the frames following the sequence-of-interest.

3. The method of claim 1, further comprising:
   storing the video stream in response to determining the at least one object-of-interest was not detected in a minimum number of images in the frames following the sequence-of-interest.

4. The method of claim 1, further comprising:
   initiating storage of frames of the video stream corresponding to the sequence-of-interest in a buffer in response to detecting the at least one object-of-interest in the at least one of the plurality of consecutive frames.

5. The method of claim 4, further comprising:
   concluding the storage of frames in the buffer in response to determining the at least one object-of-interest was not detected in a minimum number of images in the frames following the sequence-of-interest.

6. The method of claim 5, wherein the selectively compressing is performed after concluding the storage of frames in the buffer.

7. The method of claim 1, wherein the selectively compressing the at least the portion of the video stream based at least in part on the identifying comprises:
   foregoing compressing the plurality of consecutive frames of the video stream; and
   compressing another plurality of frames of the video stream.

8. A device comprising:
   a memory; and
   at least one processor configured to:
      receive a video stream comprising a plurality of frames;
      identify a sequence-of-interest comprising a plurality of consecutive frames of the video stream, wherein at least one object-of-interest was detected, using a machine-learning model, in at least one of the plurality of consecutive frames; and selectively compress at least a portion of the video stream to include or exclude the identified sequence-of-interest.

9. The device of claim 8, wherein the at least one processor is further configured to:
transmit the video stream in response to determining the at least one object-of-interest was not detected in a minimum number of images in the frames following the sequence-of-interest.

10. The device of claim 8, wherein the at least one processor is further configured to:
store the video stream in response to determining the at least one object-of-interest was not detected in a minimum number of images in the frames following the sequence-of-interest.

11. The device of claim 8, wherein the at least one processor is further configured to:
initiate storage of frames of the video stream corresponding to the sequence-of-interest in a buffer in response to detecting the at least one object-of-interest in the at least one of the plurality of consecutive frames.

12. The device of claim 11, wherein the at least one processor is further configured to:
conclude the storage of frames in the buffer in response to determining the at least one object-of-interest was not detected in a minimum number of images in the frames following the sequence-of-interest.

13. The device of claim 12, wherein the at least one processor is configured to selectively compress the at least the portion of the video stream after concluding the storage of frames in the buffer.

14. The device of claim 8, wherein the at least one processor is further configured to selectively compress the at least the portion of the video stream based at least in part on the identifying by:
foregoing compressing the plurality of consecutive frames of the video stream; and
compressing another plurality of frames of the video stream.

15. A non-transitory machine-readable medium comprising instructions that, when executed by one or more processors, cause the one or more processors to perform operations comprising:
receiving a video stream comprising a plurality of frames;
identifying a sequence-of-interest comprising a plurality of consecutive frames of the video stream, wherein at least one object-of-interest was detected, using a machine-learning model, in at least one of the plurality of consecutive frames; and
selectively compressing at least a portion of the video stream to include or exclude the identified sequence-of-interest.

16. The non-transitory machine-readable medium of claim 15, wherein the operations further comprise:
transmitting the video stream in response to determining the at least one object-of-interest was not detected in a minimum number of images in the frames following the sequence-of-interest.

17. The non-transitory machine-readable medium of claim 15, wherein the operations further comprise:
storing the video stream in response to determining the at least one object-of-interest was not detected in a minimum number of images in the frames following the sequence-of-interest.

18. The non-transitory machine-readable medium of claim 15, wherein the operations further comprise:
initiating storage of frames of the video stream corresponding to the sequence-of-interest in a buffer in response to detecting the at least one object-of-interest in the at least one of the plurality of consecutive frames.

19. The non-transitory machine-readable medium of claim 18, wherein the operations further comprise:
concluding the storage of frames in the buffer in response to determining the at least one object-of-interest was not detected in a minimum number of images in the frames following the sequence-of-interest.

20. The non-transitory machine-readable medium of claim 19, wherein the operations further comprise selectively compressing the at least the portion of the video stream after concluding the storage of frames in the buffer.

* * * * *